US007791876B2

(12) United States Patent  
Moore et al.

(10) Patent No.: US 7,791,876 B2
(45) Date of Patent: Sep. 7, 2010

(54) HINGE CONNECTOR WITH LIQUID COOLANT PATH

(75) Inventors: David A. Moore, Houston, TX (US); Mark S. Tracy, Tomball, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 182 days.

(21) Appl. No.: 12/119,090

(22) Filed: May 12, 2008

(65) Prior Publication Data

US 2009/0279258 A1 Nov. 12, 2009

(51) Int. Cl.
*H05K 7/20* (2006.01)
*H05K 5/00* (2006.01)
*G06F 1/16* (2006.01)
*F28D 15/00* (2006.01)
*E05D 7/00* (2006.01)

(52) U.S. Cl. ............ 361/679.53; 361/699; 361/679.52; 361/679.27; 165/104.33; 174/15.2; 16/221

(58) Field of Classification Search ................. 361/699, 361/672.52, 679.53, 679.27; 174/15.2; 16/221
See application file for complete search history.

(56) References Cited

U.S. PATENT DOCUMENTS

| | | | | |
|---|---|---|---|---|
| 4,040,478 A * | 8/1977 | Pogson et al. | ................. | 165/46 |
| 4,864,523 A * | 9/1989 | Sasaki | ................. | 361/679.09 |
| 5,383,340 A | 1/1995 | Larson et al. | | |
| 5,394,936 A | 3/1995 | Budelman | | |
| 5,566,048 A * | 10/1996 | Esterberg et al. | ........ | 361/679.27 |
| 5,588,483 A * | 12/1996 | Ishida | ........................ | 165/86 |
| 5,606,341 A | 2/1997 | Aguilera | | |
| 5,621,613 A * | 4/1997 | Haley et al. | ............. | 361/679.27 |
| 5,757,615 A | 5/1998 | Donahoe et al. | | |
| 5,781,409 A * | 7/1998 | Mecredy, III | .......... | 361/679.27 |
| 5,832,987 A * | 11/1998 | Lowry et al. | ................... | 165/86 |
| 5,847,925 A * | 12/1998 | Progl et al. | ............. | 361/679.47 |
| 5,880,929 A * | 3/1999 | Bhatia | .................... | 361/679.27 |
| 5,910,883 A * | 6/1999 | Cipolla et al. | .......... | 361/679.27 |
| 5,975,195 A * | 11/1999 | Lowry et al. | .................. | 165/86 |
| 6,026,888 A * | 2/2000 | Moore | ........................ | 165/80.3 |
| 6,069,791 A | 5/2000 | Goto et al. | | |
| 6,070,654 A * | 6/2000 | Ito | ........................ | 165/104.26 |
| 6,078,499 A * | 6/2000 | Mok | ..................... | 361/679.52 |
| 6,097,596 A * | 8/2000 | Cipolla et al. | .......... | 361/679.52 |

(Continued)

FOREIGN PATENT DOCUMENTS

JP 2002-014747 1/2002

(Continued)

OTHER PUBLICATIONS

International Search Report and Written Opinion, dated Dec. 7, 2009, pp. 11.

*Primary Examiner*—Jayprakash N Gandhi
*Assistant Examiner*—Bradley H Thomas

(57) ABSTRACT

A hinge for moving two parts of an electronic apparatus relative to each other is disclosed. The hinge includes two coolant flow paths helically arranged between inlet and outlet connections as portions of the hinge are rotated relative to each other. Guide plates within the hinge independently rotate to suitably position the conduits of the coolant flow paths in a position of minimum twisting and stretching. The hinge can be incorporated into any electronic apparatus, for example a portable computer.

20 Claims, 8 Drawing Sheets

U.S. PATENT DOCUMENTS

| | | | | |
|---|---|---|---|---|
| 6,134,106 | A * | 10/2000 | Tao et al. | 361/679.52 |
| 6,175,493 | B1 * | 1/2001 | Gold | 361/679.47 |
| 6,189,602 | B1 * | 2/2001 | Tanahashi et al. | 165/86 |
| 6,226,177 | B1 * | 5/2001 | Rude et al. | 361/679.52 |
| 6,250,378 | B1 * | 6/2001 | Kobayashi | 165/104.33 |
| 6,253,836 | B1 * | 7/2001 | Mitchell | 165/86 |
| 6,288,896 | B1 * | 9/2001 | Hsu | 361/679.54 |
| 6,341,062 | B1 * | 1/2002 | Patel | 361/679.54 |
| 6,377,452 | B1 * | 4/2002 | Sasaki et al. | 361/679.47 |
| 6,377,454 | B1 | 4/2002 | Inoue et al. | |
| 6,449,149 | B1 | 9/2002 | Ohashi et al. | |
| 6,493,226 | B1 * | 12/2002 | Noguchi et al. | 361/700 |
| 6,507,488 | B1 * | 1/2003 | Cipolla et al. | 361/679.52 |
| 6,507,490 | B2 * | 1/2003 | Sasaki et al. | 361/679.47 |
| 6,510,052 | B2 * | 1/2003 | Ishikawa et al. | 361/679.47 |
| 6,519,147 | B2 | 2/2003 | Nakagawa et al. | |
| 6,519,148 | B2 | 2/2003 | Nakagawa et al. | |
| 6,556,439 | B2 | 4/2003 | Shibasaki | |
| 6,587,336 | B2 | 7/2003 | Chu et al. | |
| 6,728,102 | B2 * | 4/2004 | Ishikawa et al. | 361/679.48 |
| 6,751,095 | B2 | 6/2004 | Ishikawa et al. | |
| 6,771,498 | B2 | 8/2004 | Wang et al. | |
| 6,791,834 | B2 | 9/2004 | Nakagawa et al. | |
| 6,809,927 | B2 | 10/2004 | Ohashi et al. | |
| 6,833,992 | B2 * | 12/2004 | Kusaka et al. | 361/699 |
| 6,845,011 | B2 | 1/2005 | Tomioka et al. | |
| 6,900,990 | B2 * | 5/2005 | Tomioka | 361/752 |
| 6,920,043 | B1 | 7/2005 | Ishikawa et al. | |
| 6,950,303 | B2 * | 9/2005 | Neho et al. | 361/679.08 |
| 6,989,990 | B2 | 1/2006 | Malone et al. | |
| 7,116,552 | B2 * | 10/2006 | Wu | 361/679.26 |
| 7,232,313 | B1 * | 6/2007 | Shinoda | 439/31 |
| 7,707,691 | B2 * | 5/2010 | Jeong | 16/367 |
| 2001/0022720 | A1 * | 9/2001 | Mitchell | 361/687 |
| 2002/0001176 | A1 * | 1/2002 | Shibasaki | 361/687 |
| 2002/0008960 | A1 * | 1/2002 | Mitchell | 361/687 |
| 2002/0051339 | A1 * | 5/2002 | Ohashi et al. | 361/687 |
| 2004/0070940 | A1 * | 4/2004 | Tomioka et al. | 361/699 |
| 2004/0070942 | A1 * | 4/2004 | Tomioka et al. | 361/700 |
| 2004/0080908 | A1 * | 4/2004 | Wang et al. | 361/687 |
| 2005/0180107 | A1 * | 8/2005 | Naganawa et al. | 361/699 |
| 2005/0225952 | A1 * | 10/2005 | Takagi | 361/749 |
| 2006/0005549 | A1 * | 1/2006 | Ishinabe et al. | 62/3.2 |
| 2007/0019370 | A1 * | 1/2007 | Noh | 361/679 |
| 2007/0070599 | A1 * | 3/2007 | Chang | 361/687 |
| 2007/0221360 | A1 * | 9/2007 | Hayashi et al. | 165/42 |
| 2008/0266798 | A1 * | 10/2008 | Eckberg et al. | 361/699 |

FOREIGN PATENT DOCUMENTS

| | | |
|---|---|---|
| JP | 2004-040123 | 2/2004 |
| JP | 2005-190091 | 7/2005 |

* cited by examiner

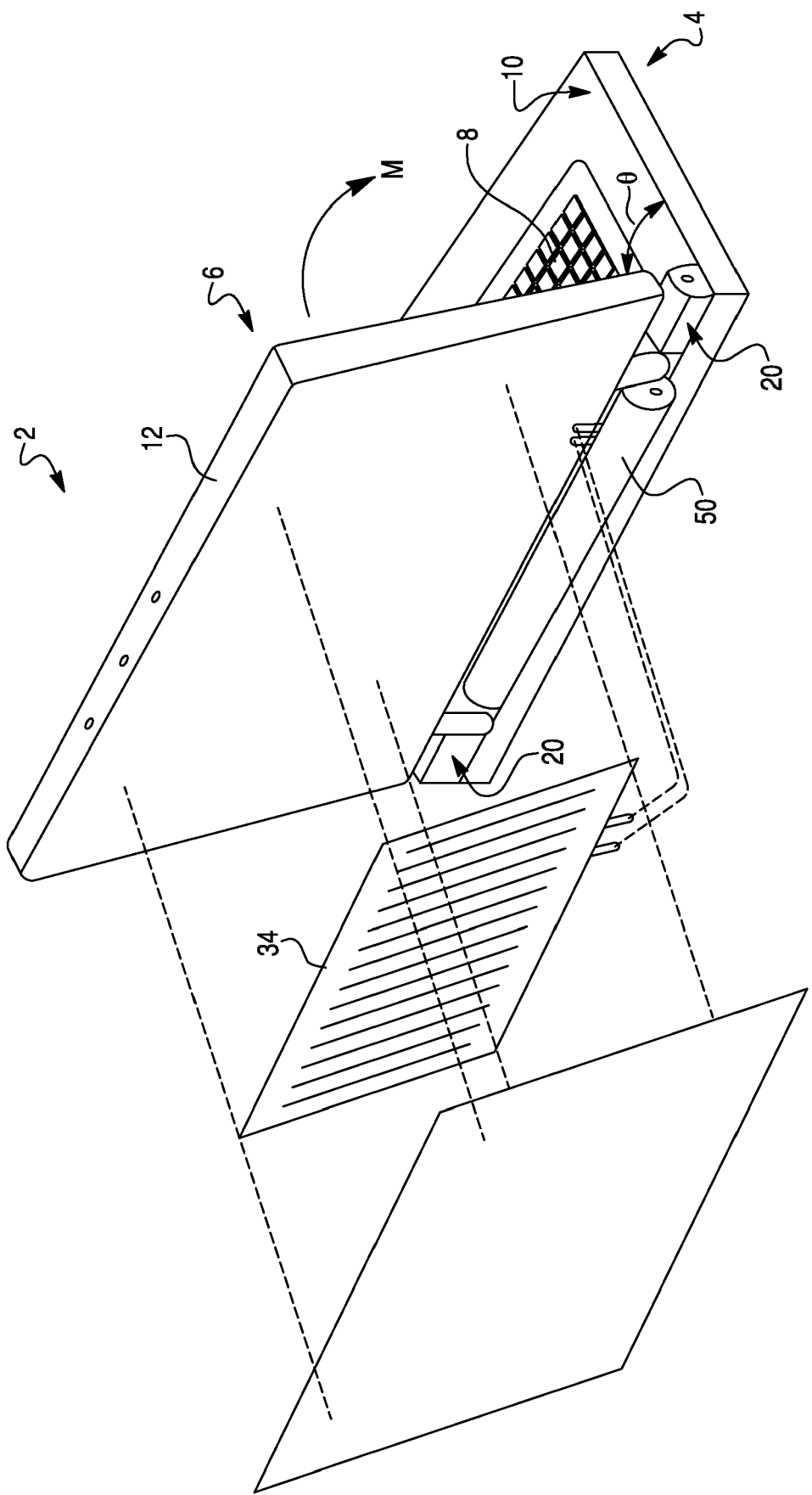

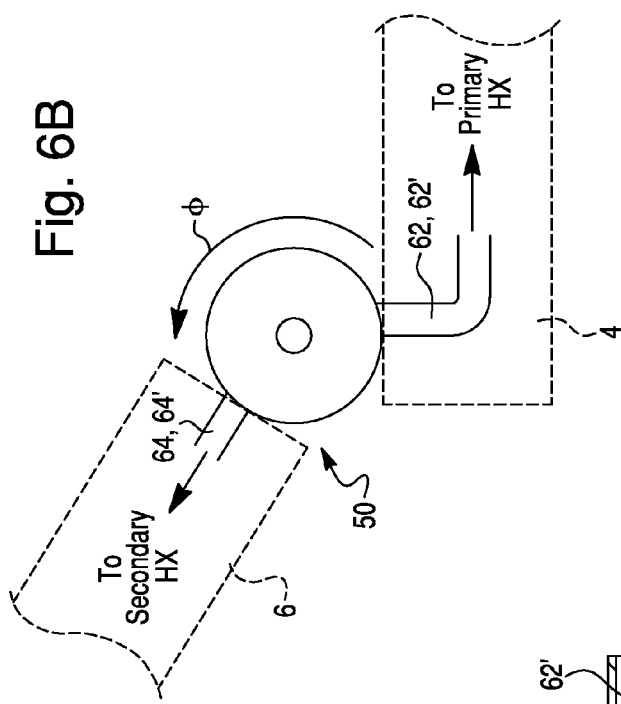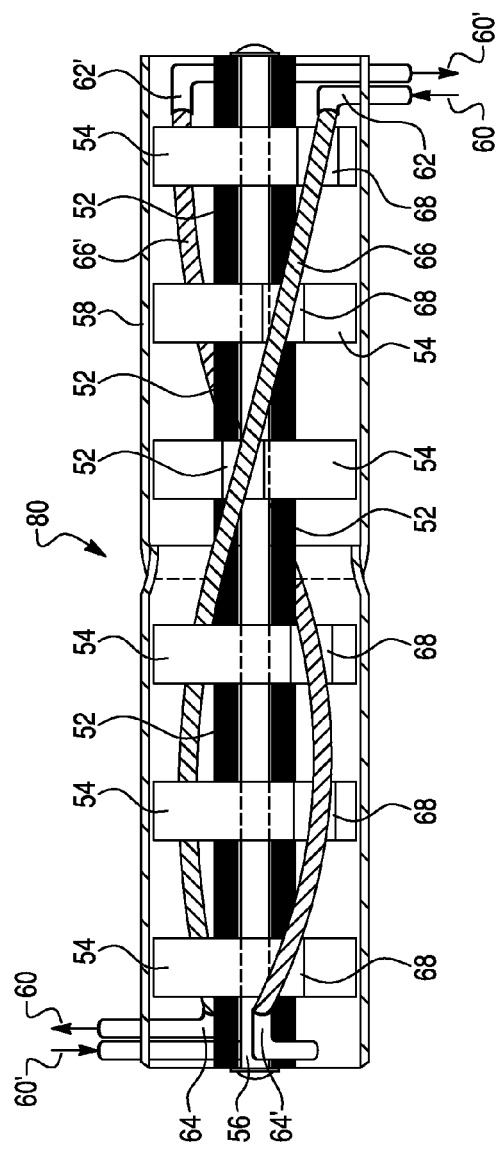

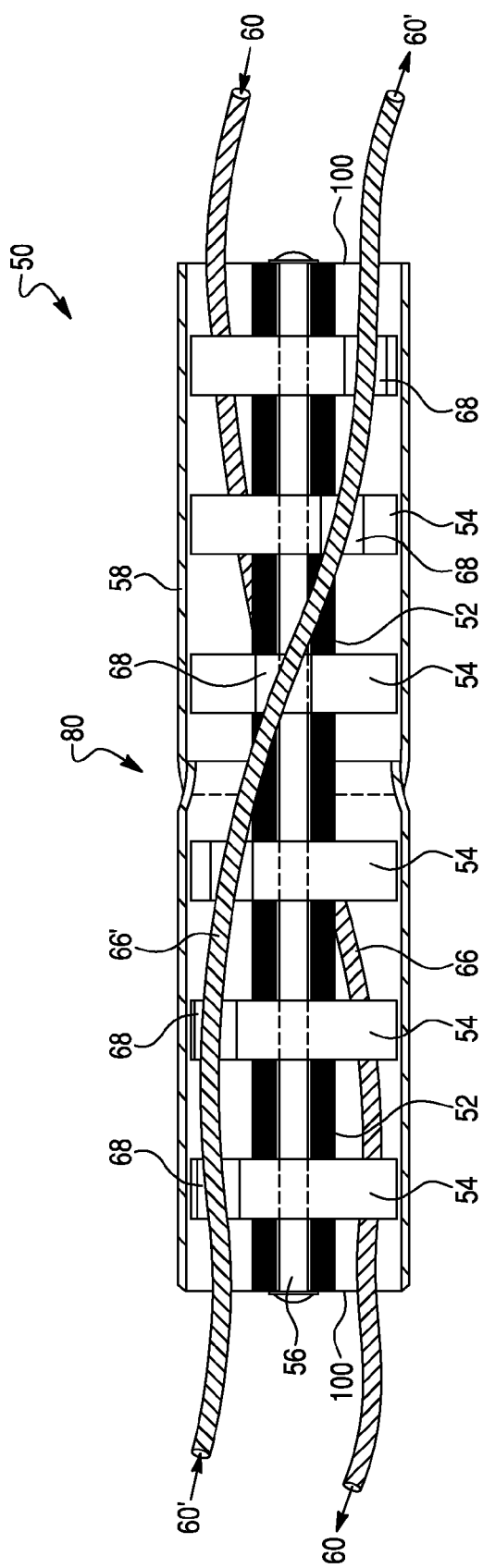

HINGE CONNECTOR WITH LIQUID COOLANT PATH

BACKGROUND

Cooling design for electronics, particularly portable electronics such as notebook computers, is increasingly difficult as chipset power dissipation continues to rise. Conventional methods of forced air cooling and liquid cooling have proven inadequate and/or difficult to implement.

BRIEF DESCRIPTION OF THE DRAWINGS

The following detailed description can be read in connection with the accompanying drawings in which like numerals designate like elements and in which:

FIG. 3 is shows a perspective, partially disassembled view of a LCD display section showing an embodiment of a secondary heat exchanger.

FIG. 6A is a side, partial cross-sectional view of the embodiment of the hinge in FIG. 4A in a third position.

FIG. 6B is an end view of the embodiment of the hinge in FIG. 6A.

FIG. 10 is a side, partial cross-sectional view of another embodiment of a hinge with a liquid coolant path in a first position.

DETAILED DESCRIPTION

Figure 1:
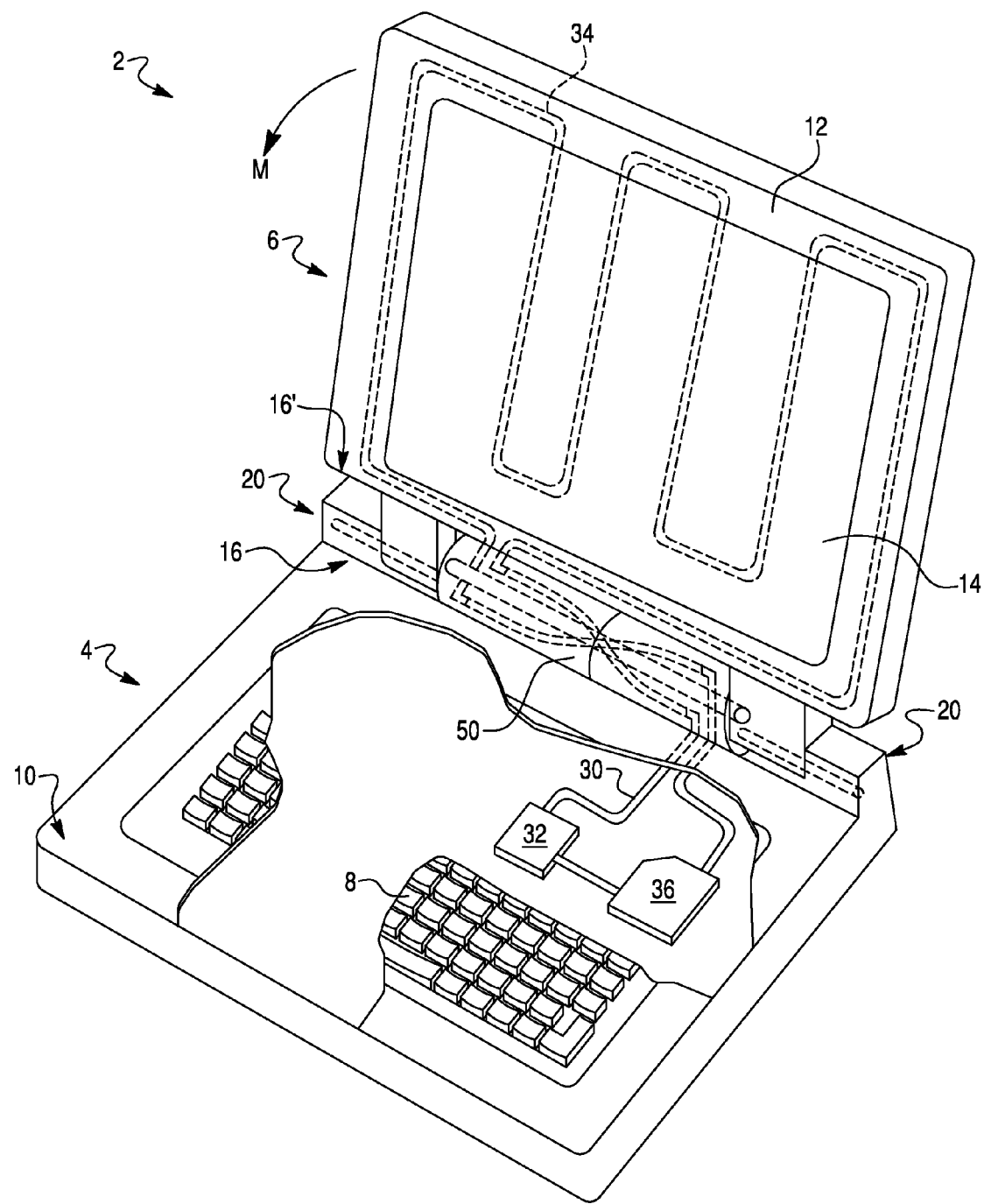
FIG. 1 shows a perspective, partial cut-away view of an electronic apparatus with an embodiment of a liquid coolant flow path.
Figure 2:
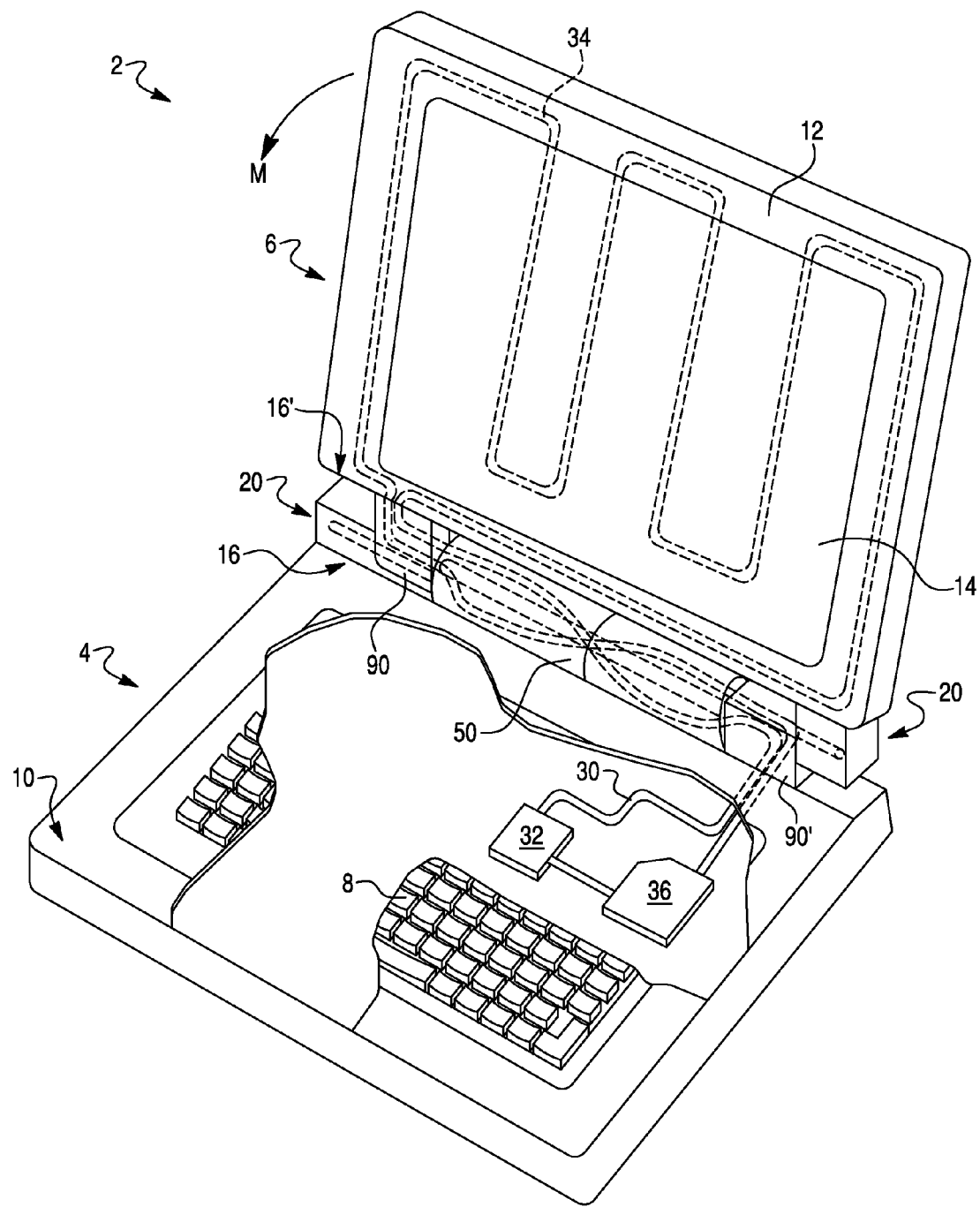
FIG. 2 shows a perspective, partial cut-away view of an electronic apparatus with another embodiment of a liquid coolant flow path.

There is shown in FIG. 1 an example electronic apparatus incorporating an embodiment of a hinge with a liquid coolant path. FIG. 2 shows an electronic apparatus incorporating another embodiment of a hinge with a liquid coolant path. In FIGS. 1 and 2, the example electronic apparatus is a portable computer 2. The embodiment of a portable computer will be carried through in this disclosure, but it should be understood that the features, functions and principles disclosed herein can be similarly applied to other electronic apparatus or non-electronic apparatus (e.g., automotive cooling) where a liquid coolant path is used between a primary heat exchanger and a secondary heat exchanger.

Turning again to FIGS. 1 and 2, the portable computer 2 includes a main unit 4 and a display unit 6. The main unit 4 is flat box shaped and contains the principal electronics and other components of the portable computer. A keyboard 8 is shown in a top wall 10 of the main unit 4. The display unit 6 of the portable computer 2 includes a housing 12 and a liquid crystal display panel (also referred as "LCD panel") 14.

The display unit 6 is supported at and attached to the main unit 4 at respective edge regions 16, 16' via one or more hinges. Thus, the display unit 6 is movable M about the one or more hinges between a closed position laid on the main unit 4 so as to cover the keyboard 8 from above and an open position at which the display unit 6 is erected so as to expose the keyboard 8 and the LCD panel 14.

The one or more hinges can provide mechanical and/or electrical connection between the display unit 6 and the main unit 4. For example, a first hinge can be a friction hinge 20. The friction hinge 20 holds the display unit 6 in a set position upon moving of the display unit 6 by a user. In the embodiment shown in FIG. 1, two friction hinges 20 are provided, one at each end of the joined edge regions 16,16'. However, any suitable number of friction hinges can be used and the position of the friction hinges along the joined edge regions can vary to accommodate various connecting schemes as well as other types of hinges, as described herein below. In another example, electrical connections between the CPU in the main unit 4 and the LCD panel 14 in the display unit 6 are routed through the one or more hinges, as is known in the art.

To cool the example electronic apparatus, a liquid coolant path 30 exists between the display unit 12 and the main unit 4. In the embodiment shown in FIG. 1, the liquid coolant path 30 is a closed loop system providing a flow path for liquid coolant from a primary heat exchanger 32 to a secondary heat exchanger 34. The primary heat exchanger 32 is located in the main unit 4 and the secondary heat exchanger 34 is located in the display unit 6. The primary heat exchanger 32 and the secondary heat exchanger 34 can take any suitable form. For example, in FIG. 1, the secondary heat exchanger 34 is illustrated as a series of loops in the display unit 6. Also for example, in FIG. 3, the secondary heat exchanger 34 is illustrated as a panel radiator in the display unit 12. A pump 36 or other device to impart coolant flow is included in the liquid coolant path 30.

The liquid coolant path 30 traverses the separation between the display unit 6 and the main unit 4 via one or more hinges that includes a portion of the liquid coolant path 30. The hinge(s) incorporating the coolant path 30 between the display unit 6 and the main unit 4 can be the same hinge as that providing mechanical and/or electrical connection between the display unit 6 and the main unit 4 or can be a separate hinge(s). In the embodiments shown in FIG. 1 or FIG. 2, a separate hinge 50 includes the portion of the liquid coolant path 30 between the display unit 6 and the main unit 4.

An embodiment of a hinge 50 that includes the liquid coolant path is shown in FIGS. 4A and 4B, 5A and 5B and 6A and 6B. These figures show the hinge in three different positions, corresponding to three different positions of the display unit 6 relative to the main unit 4 as the display unit 6 is moved between a closed position and an open position. The three example positions illustrated are (i) a first open position where the display unit 6 is at an angle ($\theta$) to the main unit 4 of approximately (±10%) 90° (shown in FIGS. 4A and 4B), (ii) a closed position (shown in FIGS. 5A and 5B), and (iii) a second open position where the display unit 6 is at an angle ($\theta$) to the main unit 4 of approximately (±10%) 135° (shown in FIGS. 6A and 6B). Note that the angle $\theta$ is between the surfaces of the display unit 6 and the main unit 4 while the angle $\phi$ is between the inlet and outlet positions on the two portions of the shroud. In the figures, the hinge is assumed to be on a top surface of the main unit 4 and on an edge face of the display unit, thus the angle $\phi$ is approximately 90° larger than $\theta$, but this may vary as the position the hinge is attached to the display unit and/or the main unit differs from that shown here.

Figure 4B:
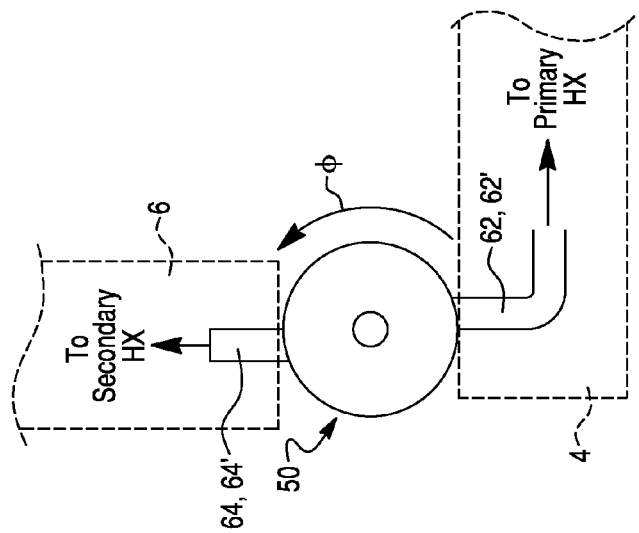
FIG. 4B is an end view of the embodiment of the hinge in FIG. 4A.
Figure 4A:
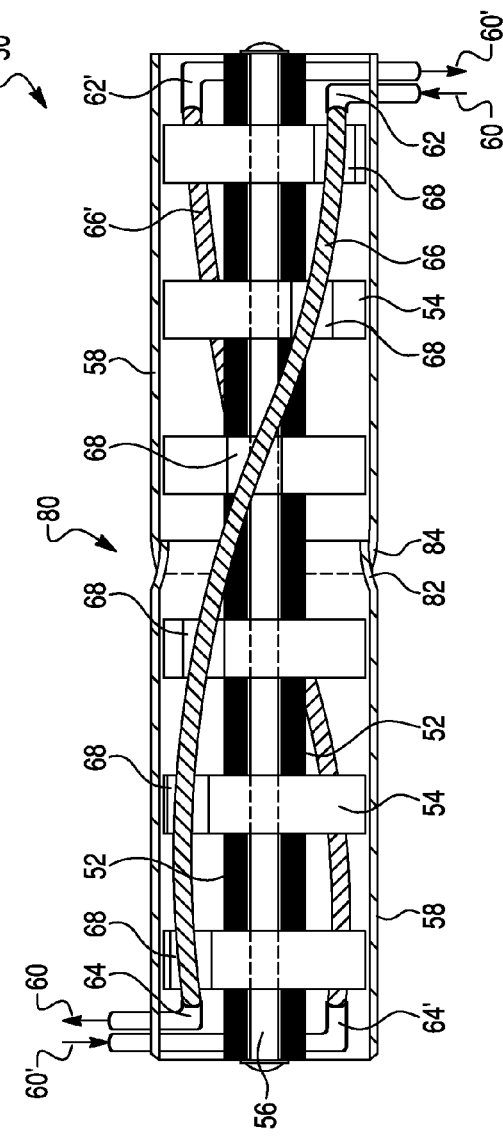
FIG. 4A is a side, partial cross-sectional view of an embodiment of a hinge with a liquid coolant path in a first position.

FIGS. 4A and 4B show an exemplary embodiment of a hinge 50 in a first position. FIG. 4A is a partial axial cross-section and FIG. 4B is an end view. The hinge 50 includes a plurality of spacers 52 and a plurality of guide plates 54 arranged longitudinally along a spindle 56 within a shroud 58. The hinge 50 includes two coolant flow paths 60,60'. Each coolant flow path 60,60' runs from an inlet to an outlet in different portions of the shroud, the different positions rotatable relative to each other. In the illustrated embodiment, the two coolant flow paths 60,60' are illustrated with a first connecting joint 62,62' and a second connecting joint 64,64'. However, the connecting joints can be replaced by a continuous section of the conduit sufficient to extend through the shroud 58 and connecting or continuing in the coolant path in the display unit 6 or the main unit 4.

In a closed loop system, the two coolant flow paths 60,60' are the portion of the liquid coolant path 30 from the primary heat exchanger 32 to the secondary heat exchanger 34 and the portion from the secondary heat exchanger 34 to the primary heat exchanger 32 that are associated with or pass through the hinge 50 or its associated structure, such as a protruding inlet and/or outlet. The inlets and outlets of the hinge 50 are suitably associated with, and connected to or continuous with, the coolant paths to and from the primary heat exchanger 32 housed, for example, in the main unit 4 and the coolant paths to and from the secondary heat exchanger 34 housed, for example, in the display unit 6.

A conduit 66,66' runs between the respective inlets and outlets. In one embodiment, the conduit 66,66' is a length of flexible tube but can alternatively be constructed of any suitable material that can move with operation of the hinge. In one embodiment, the conduit 66, 66' is jointless and runs continuously from the primary heat exchanger 36 in the main unit 4, through the hinge 50, to the secondary heat exchanger 34, through the hinge 50 and back to the primary heat exchanger 36. In another embodiment, the conduit 66, 66' is flexible tubing in the hinge 50 and is connected within the hinge 50 to rigid connection, such as first connecting joint 62, 62' and second connecting joint 64, 64'. Here, the conduit 66, 66' is flexible and avoids tight radius turns or other wear causing paths and arrangements. However, because the connectors are stationary relative to the respective portion of the shroud in which it is located and in this region do not need to flex during operation, they can be rigid, e.g., metal or plastic tubing or piping, and can have tight radius bends. In this embodiment or in other embodiments needing a connection, the conduit can be connected to the connecting joints by any suitable means. For example, a clamp, a compression fitting, or a direct bonding such as soldering can be used, depending on the respective materials of the conduit and the connecting joints.

An alternative embodiment without connectors is shown in FIG. 10, described further below.

Figure 7:
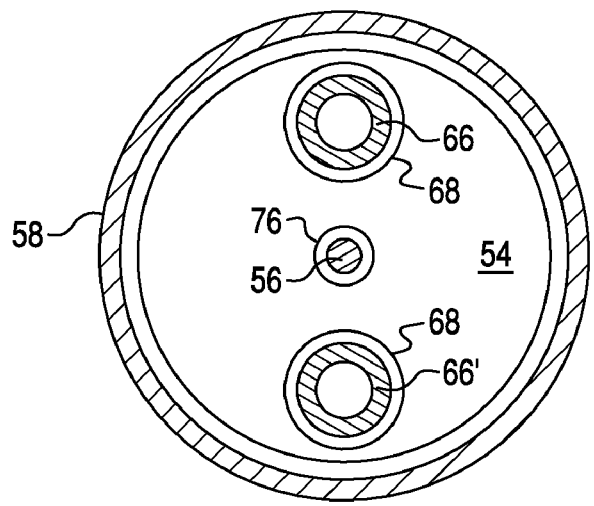
FIG. 7 is a radial cross-section of the hinge showing an embodiment of a guide plate.
Figure 8:
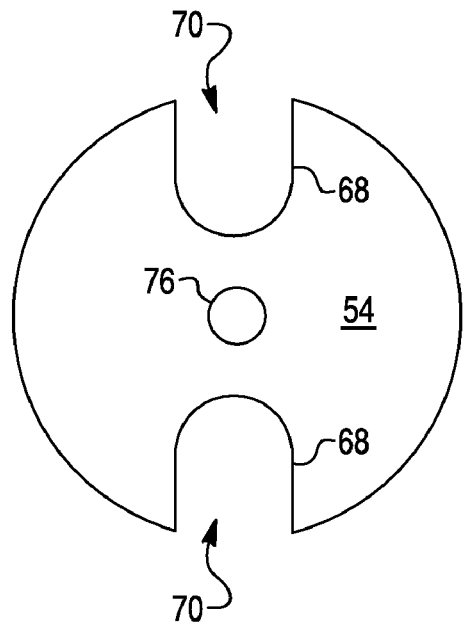
FIG. 8 is another embodiment of a guide plate.
Figure 9:
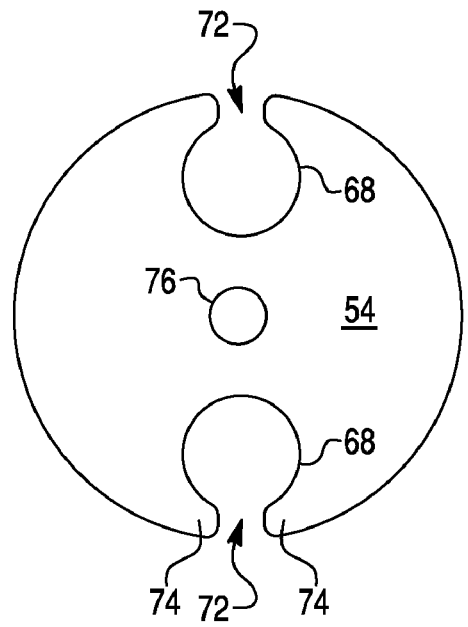
FIG. 9 is a further embodiment of a guide plate.

The conduits 66,66' run between the respective inlet and outlet of each coolant flow path 60,60' and are positioned within a tube guide 68 in each of the guide plates 54. An exemplary radial cross-section of the hinge 50 showing the conduits 66,66' positioned within a tube guide 68 of the guide plate 54 is illustrated in FIG. 7. In FIG. 7, the tube guide 68 is a closed feature such as a hole through the guide plate 54. Alternative embodiments of the tube guide are shown in FIGS. 8 and 9. FIG. 8 illustrates the tube guide 68 as an open structure where the opening 70 of the open structure is the same or greater than a diameter of the conduit, such as a u-shape or a horseshoe shape. FIG. 9 illustrates tube guide 68 as an open structure where the opening 72 of the open structure has indents or other restricting feature 74 so that the diameter of the opening 72 is less than a diameter of the conduit. In each case, the tube guide 68 does not restrict either rotational movement or longitudinal movement of the conduit 66,66' in the tube guide 68. In the exemplary embodiments shown, each guide plate 54 has two openings, although the number of openings can be larger or smaller depending on the number of conduits are to be accommodated by the hinge. As illustrated, the openings 72 are angularly separated by about (±10%) 180°, but the openings 72 could be angularly separated by at least about (±10%) 45° to about (±10%) 180. A hole 76 to allow passage of the spindle 56 and rotation of the guide plate 54 is also shown in FIGS. 7-9.

Turning again to the longitudinal cross-section of the hinge 50 shown in FIG. 4A, the shroud 58 encases the plurality of spacers 52, the plurality of guide plates 54, and the two coolant flow paths 60,60'. To allow movement, the shroud includes two portions longitudinally connected by the spindle 56 where the first portion is rotatable about the spindle relative to the second portion. For example, the shroud 58 can include a glide joint or other suitable slidable or rotatable joint at an interface 80 between the first portion and the second portion of the shroud 58. At an exemplary interface 80, an edge 82 of one of the portions of the shroud 58 is of a smaller diameter than, and fits within, an edge 84 of a second of the portions of the shroud 58. The contact surfaces can be suitably treated, such as by applying a poly(tetrafluoroethylene) (PTFE) coating or other coating, to provide smooth relative motion between the two portions. The shroud can be made from any suitable material, such as a plastic, a composite or a metal.

The hinge 50 allows relative movement of the two parts of an electronic apparatus to which it is attached. For example, the portion of the hinge 50 with the inlet and outlet of the coolant paths that lead to the primary heat exchanger can be connected to a main unit 4 of a portable computer and the portion of the hinge 50 with the inlet and outlet of the coolant paths that lead to the secondary heat exchanger can be connected to a display unit 6 of a portable computer. Such a connection is shown in different embodiments in FIG. 1 and FIG. 2.

In the embodiment in FIG. 1, the coolant path 30 between the display unit 6 and the main unit 4 is within the hinge 50. Thus, the coolant path connections between the hinge 50 and the display unit 6 and main unit 4 are through a side wall of the shroud 58 of the hinge 50.

In the embodiment in FIG. 2, the coolant path 30 between the display unit 6 and the main unit 4 is within the hinge 50 and within an extension 90 projecting from one or the other of the display unit 6 and the main unit 4. This extension is optionally part of the friction hinge 20. When the extension 90 is part of the friction hinge 20, the portion of the friction hinge connected to the display unit 6 and the portion of the friction hinge connected to the main unit 4 are positioned so that the extension 90 from the display unit 6 abuts one end of the hinge 50 and the extension 90 from the main unit 4 abuts the other end of the hinge 50. This provides an extension 90 at each end of the hinge 50 that is not rotating relative to the end wall of the hinge 50 to which it abuts. Thus, the coolant path connections between the hinge 50 and the display unit 6 and the main unit 4 are through a respective end wall of the shroud 58 of the hinge 50.

In some embodiments and as shown in FIGS. 4A-B, 5A-B and 6A-B, the first connecting joint 62,62' and the second connecting joint 64,64' penetrate the shroud 58 through a side wall. As such, the respective portions of the hinge 50 rotate relative to each other as the display unit 6 moves relative to the main unit 4. As the respective portions of the hinge 50 rotate, the components internal to the hinge 50 move to accommodate the rotation. This movement is in generally in conjunction with movement of the display unit relative to the main unit 4 and is in a positive or negative rotational direction.

For example, FIGS. 4A and 4B show the hinge where the display unit 6 is at an angle (θ) to the main unit 4 of approximately (±10%) 90°. Because the first connecting joint 62,62' that leads to the primary heat exchanger in the main unit 4 penetrates the side wall of the shroud 58 in this embodiment, the angular separation (φ) of the first connecting joint 62,62' and the second connecting joint 64,64' is as shown in FIG. 4B, where φ is approximately (±10%) 180°. Internally, an angular separation φ of approximately (±10%) 180° places the conduits 66,66' in a first helical position, where the conduits 66,66' are rotated and helically twisted, i.e. torsionally flexed, and/or stretched along their length from first connecting joint 62,62' to second connecting joint 64,64'.

Figure 5B:
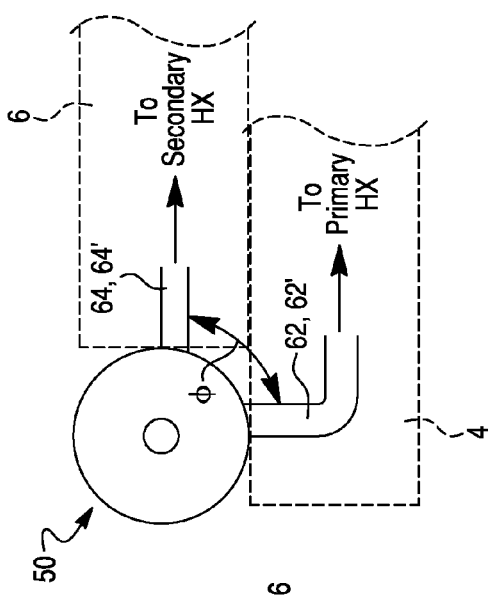
FIG. 5B is an end view of the embodiment of the hinge in FIG. 5A.
Figure 5A:
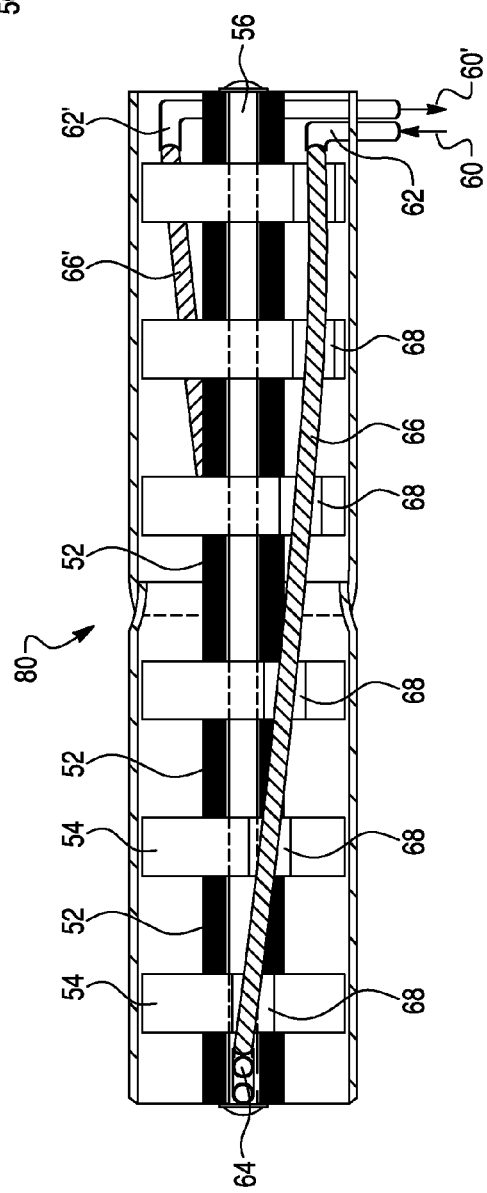
FIG. 5A is a side, partial cross-sectional view of the embodiment of the hinge in FIG. 4A in a second position.

FIGS. 5A and 5B show the hinge where the display unit 6 is at an angle (θ) to the main unit 4 of approximately 0°±10°. In this position, i.e., the closed position of the portable computer, the angular separation (φ) of the first connecting joint 62,62' and the second connecting joint 64,64' is as shown in FIG. 5B, where φ is approximately (±10%) 90°. Internally, the conduits 66,66' are in a first non-helical position. That is, the conduits 66,66' are contained within separate axial cross-sections of the shroud and are not helically twisted, with a first conduit 66 not overlapping the second conduit, except for possibly at the locations where the conduits 66,66' attach to the first connecting joint 62,62' and/or the second connecting joint 64,64', depending on the arrangement of the connecting joints.

FIGS. 6A and 6B show the hinge in a second opened position of the portable computer where the display unit 6 is at an angle (θ) to the main unit 4 of approximately (±10%) 135°. In this position, the angular separation (φ) of the first connecting joint 62,62' and the second connecting joint 64,64' is as shown in FIG. 6B, where φ is approximately (±10%) 225°. Internally, the conduits 66,66' are both more stretched and/or more twisted than in the FIGS. 4A and 4B embodiment.

In another embodiment and as shown in FIG. 10, the inlets and outlets of the two coolant paths penetrate the shroud 58 through an end wall 100 and are routed through an abutting extension 90,90' from either the display unit or from the main unit. This abutting extension can be incorporated optionally into the friction hinge 20. As such, the respective portions of the hinge 50 rotate relative to each other as the extension 90 connected to the display unit 6 moves relative to the extension 90' connected to the main unit 4. As the respective portions of the hinge 50 rotate, the components internal to the hinge 50 move to accommodate the rotation. Because the coolant flow paths 60, 60' penetrate the end wall of the shroud 58 in this embodiment, the internal arrangement of the conduits 66,66' is not dependent on the angular separation (φ), but rather is dependent on the ability to connect the end wall 100 to the projections 90, 90'. Of course once connected, the movement of the display unit 6 and the main unit 4 to different opened/closed positions also moves the conduits 66, 66' to different positions, from non-helically twisted to helically twisted or vice versa.

Views of other positions of the embodiment of the hinge 50 in FIG. 10 showing the internal components including the conduits 66, 66' at different positions are not included here, but the arrangement, the rotation, the stretching and the twisting of such components is similar to that shown and described in connection with FIGS. 4A-4B, 5A-B and 6A-B.

In general, the rotation and twisting of the conduits 66,66' in different embodiments of the hinges 50 are minimized by passing the inlet and outlets through the ends 100 of the shroud 58 or by selecting the internal connecting geometry of the first connecting joint 62,62' and second connecting joint 64,64' to minimize the stretching and twisting in a particular position, e.g., the position of the display unit and the main unit during the expected greatest usage time of the portable computer, relative to other less used positions of the display unit and the main unit. The position of minimized stretching and twisting is considered the neutral position of the hinge. From the neutral position, the hinge (or the shroud of the hinge) is rotatable within a range of 0° to fully opened, e.g., approximately (±10%) 135°. Of course, other neutral positions can be selected. To minimize the twisting and stretching of the conduits, the neutral position can be varied. Depending on the deviation form the closed position of the selected neutral position, the hinge will rotate more or less in each of the positive and negative rotational directions.

To facilitate minimizing the stretching and twisting of the conduits 66,66', at least some of the guide plates are independently rotatable about the spindle. For example, a first guide plate and a second guide plate can independently rotate about the spindle (with other guide plates either fixed or themselves independently rotatable, alternatively all guide plates independently rotatable) to helically position the flexible tubes when the first portion of the shroud is rotated about the spindle relative to the second portion of the shroud. While not all guide plates need to be independently rotatable, independent rotation of the guide plates allows for the conduits to find their own position of minimum stretching and twisting.

In another embodiment, the angular rotation of each spacer is limited to a certain range. This feature could be used to limit the number of degrees each guide plate can rotate. In addition, this feature can facilitate distributing the rotation of the helical conduit evenly across the entire axial length of the hinge. As an example, this feature could be accomplished by adding a rectangular post on one end of each rotating element, and coaxial to the spindle. This post would mate with a "bowtie" shaped socket on each rotating element in such a way to allow free rotation within a limited number of degrees. After the "stop" is reached the rotation would be transferred to the next rotating element.

The spacers 52 and guide plates 54 are shown as alternating along the longitudinal length of the spindle 56. Alternatively, the spacers 52 and guide plates 54 can be in non-alternating sequence, or in other sequences as desired to obtain suitable movement of the coolant path within the hinge. Also, the guide plates 54 and spacers 52 are illustrated as separate structures. However, the spacers can alternatively be formed as part of the guide plates or the guide plates or spindle can be modified to incorporated a structure that can function to axially space successive guide plates.

The pump 36 can be any suitable pump. In an exemplary embodiment, the pump is a type that does not have any rotating parts. To maintain the same or smaller form factor for the electronic device, the pump can occupy a space that is the same or less than that of the fan or other cooling system that it replaces. An example of a suitable pump is a piezoelectric pump, such as is available from Alps Electric Co., Ltd. of Tokyo Japan. The Alps pump is a piezoelectric diaphragm type pump with two chambers and 4 reed valves and has dimensions of 34 mm×37 mm×8 mm, making it smaller than most notebook fans. This pump weighs less than 25 g, and runs on 5 VDC with a power consumption of less than 1.5 W. It can move 250 ml/min at free delivery and 11-ml/min against 10 kPa of back pressure, and has a 44000 hour rated life. The pump is rated for use between 0° C. and 60° C. operating temperature and is very quiet at ≦25 dBA.

The pump is just one element of a complete cooling system. A practical liquid cooled notebook requires a number of other components. For example, a secondary heat exchanger can be mounted behind the LCD screen as shown in FIG. 3. An example of a secondary heat exchanger can be made of sheet copper folded and soldered to make a 13 cm×25 cm assembly that is less than 4 mm thick. An example of a primary heat exchanger is a water block installed directly onto a source of heat, such as a processor or a chip.

Liquid cooling can also be adapted to liquid cooling within blade server products. Here, a pump can be mounted within a blade and power a "slave' cooling loop. Heat could be exchanged with a central cooling solution in the multi-blade housing a dry plate heat exchanger. This would allow blades to be used in dusty environments such as remote server closets and mobile platforms.

What is claimed is:

1. A hinge for moving two parts of an electronic apparatus relative to each other, the hinge comprising:
    a plurality of guide plates arranged longitudinally along a spindle;
    two coolant flow paths, each coolant flow path including an inlet and an outlet and a flexible tube therebetween; and
    a shroud encasing the plurality of guide plates and the two coolant flow paths,
    wherein the shroud includes two portions longitudinally connected by the spindle, the two portions including a first portion that is rotatable about the spindle relative to a second portion, and
    wherein the flexible tube is positioned in a respective opening in the guide plates.

2. The hinge according to claim 1, wherein the electronic apparatus is a portable computer including a display unit and a main unit and wherein the first portion of the shroud is rigidly connected to the main unit and the second portion of the shroud is rigidly connected to the display unit.

3. The hinge according to claim 1, wherein the two coolant flow paths include a first coolant flow path and a second coolant flow path and an inlet of the first coolant flow path and an outlet of the second coolant flow path are in the first portion of the shroud and an outlet of the first coolant flow path and an inlet of the second coolant flow path are in the second portion of the shroud.

4. The hinge according to claim 3, wherein at least one of the two coolant flow paths penetrates through an end wall of the shroud.

5. The hinge according to claim 3, wherein at least one of the two coolant flow paths penetrates through a side wall of the shroud.

6. The hinge according to claim 3,
    wherein the first coolant flow path is in a main unit and includes a primary heat exchanger, and wherein the second coolant flow path is in a display unit and includes a secondary heat exchanger.

7. The hinge according to claim 1, wherein the plurality of guide plates include a first guide plate that is rotatable about the spindle independently from a second guide plate.

8. The hinge according to claim 1, wherein the plurality of guide plates include a first guide plate and a second guide plate that independently rotate about the spindle to helically position the flexible tube when the first portion of the shroud is rotated about the spindle relative to the second portion of the shroud.

9. The hinge according to claim 1, wherein each guide plate rotates about the spindle to helically position the flexible tube when the first portion of the shroud is rotated about the spindle relative to the second portion of the shroud.

10. The hinge according to claim 1, wherein each guide plate has two openings and wherein the two openings are angularly separated by at least about 45° to about 180°.

11. The hinge according to claim 1, wherein the first portion of the shroud is rotatable within a range of −45° to +145° relative to the second portion of the shroud.

12. The hinge according to claim 11, wherein the electronic apparatus is a portable computer including a display unit and a main unit, wherein the first portion of the shroud is rigidly connected to the main unit and the second portion of the shroud is rigidly connected to the display unit.

13. The hinge according to claim 12, wherein a closed position of the display unit correlates to an angle of rotation between the first portion of the shroud and the second portion of the shroud of 0°.

14. An electronic apparatus comprising:
    a first part and a separate second part;
    a closed coolant path within the first part and the second part; and
    a hinge connected to each of the first part and the second part for moving the first and second parts relative to each other,
    wherein the hinge includes a plurality of guide plates arranged longitudinally along a spindle, two coolant flow paths, each of the two coolant flow paths including a first connecting joint, a second connecting joint and a flexible tube therebetween, and a shroud encasing the plurality of guide plates and the two coolant flow paths,
    wherein the shroud includes two portions longitudinally connected by the spindle, the two portions including a first portion that is rotatable about the spindle relative to a second portion, and
    wherein each of the flexible tubes is positioned in a respective opening in the guide plates.

15. The electronic apparatus of claim 14, wherein the electronic apparatus is a portable computer, wherein the first part is a main unit and the second part is a display unit, and wherein the first portion of the shroud is rigidly connected to the main unit and the second portion of the shroud is rigidly connected to the display unit.

16. The electronic apparatus of claim 14, wherein the two coolant flow paths include a first coolant flow path and a second coolant flow path and an inlet of the first coolant flow path and an outlet of the second coolant flow path are in the first portion of the shroud and an outlet of the first coolant flow path and an inlet of the second coolant flow path are in the second portion of the shroud and wherein at least one of the two coolant flow paths penetrates through an end wall of the shroud.

17. The electronic apparatus of claim 14, wherein the two coolant flow paths include a first coolant flow path and a second coolant flow path, and an inlet of the first coolant flow path and an outlet of the second coolant flow path are in the first portion of the shroud and an outlet of the first coolant flow path and an inlet of the second coolant flow path are in the second portion of the shroud and wherein at least one of the two coolant flow paths penetrates through a side wall of the shroud.

18. The electronic apparatus of claim 14,
    wherein the first coolant flow path is in a main unit and includes a primary heat exchanger, and wherein the second coolant flow path is in a display unit and includes a secondary heat exchanger.

19. The electronic apparatus of claim 14, wherein the plurality of guide plates include a first guide plate and a second guide plate that independently rotate about the spindle to helically position the flexible tubes when the first portion of the shroud is rotated about the spindle relative to the second portion of the shroud.

20. The electronic apparatus of claim 14, wherein the first portion of the shroud is rotatable within a range of −45° to +145° relative to the second portion of the shroud.

* * * * *

UNITED STATES PATENT AND TRADEMARK OFFICE
CERTIFICATE OF CORRECTION

PATENT NO. : 7,791,876 B2
APPLICATION NO. : 12/119090
DATED : September 7, 2010
INVENTOR(S) : David A. Moore et al.

Page 1 of 1

It is certified that error appears in the above-identified patent and that said Letters Patent is hereby corrected as shown below:

In column 7, line 16, after "housing" insert -- using --.

In column 7, lines 52-53, in Claim 6,
delete "The hinge according to claim 3,
   wherein the first coolant flow path is in a main unit and" and
insert -- The hinge according to claim 3, wherein the first coolant flow path is in a main unit and --, therefor.

In column 8, lines 63-64, in Claim 18,
 delete "The electronic apparatus of claim 14,
   wherein the first coolant flow path is in a main unit and" and
insert -- The electronic apparatus of claim 14, wherein the first coolant flow path is in a main unit and --, therefor.

Signed and Sealed this
First Day of March, 2011

David J. Kappos
*Director of the United States Patent and Trademark Office*